United States Patent
Baba

(10) Patent No.: US 10,099,118 B2
(45) Date of Patent: Oct. 16, 2018

(54) INTERFACE FOR ADVANCING GAME BY TOUCH INPUT, AND TERMINAL

(71) Applicant: COLOPL, Inc., Tokyo (JP)

(72) Inventor: Naruatsu Baba, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/542,971

(22) PCT Filed: Jan. 12, 2016

(86) PCT No.: PCT/JP2016/050630
§ 371 (c)(1),
(2) Date: Jul. 12, 2017

(87) PCT Pub. No.: WO2016/114247
PCT Pub. Date: Jul. 21, 2016

(65) Prior Publication Data
US 2018/0021672 A1     Jan. 25, 2018

(30) Foreign Application Priority Data
Jan. 14, 2015  (JP) .................................. 2015-004872

(51) Int. Cl.
*A63F 13/2145* (2014.01)
*A63F 13/25* (2014.01)
(Continued)

(52) U.S. Cl.
CPC .......... *A63F 13/2145* (2014.09); *A63F 13/25* (2014.09); *A63F 13/30* (2014.09);
(Continued)

(58) Field of Classification Search
USPC ....................................... 463/25–43; 473/407
See application file for complete search history.

(56) References Cited

U.S. PATENT DOCUMENTS

2013/0005463 A1     1/2013  Yamamoto

FOREIGN PATENT DOCUMENTS

| JP | 2009-240620 A | 10/2009 |
| JP | 2011-189011 A | 9/2011 |
| JP | 2013-386 A | 1/2013 |

OTHER PUBLICATIONS

Office Action in TW Patent Application No. 105100897, dated Dec. 14, 2016, 8pp.
(Continued)

Primary Examiner — Masud Ahmed
(74) Attorney, Agent, or Firm — Hauptman Ham, LLP

(57) ABSTRACT

A terminal includes a display, a touch panel, and a processor. The processor is configured to detect an initial touch position corresponding to a first touch input. The processor is configured to generate instructions for displaying a timing indicator that moves from the initial touch position to a predetermined position, and then moves from the predetermined position to the initial touch position. The processor is configured to detect whether a next touch input is received when the timing indicator is displayed as overlapping the initial touch position. The processor is configured to generate instructions for displaying an elastic object having an initial shape at the initial touch position. The processor is configured to generate instructions for displaying the elastic object deformed from the initial shape so as to form a leading edge portion extending toward the predetermined position. The timing indicator superimposed over the leading edge portion.

18 Claims, 7 Drawing Sheets

(51) Int. Cl.
 *A63F 13/44* (2014.01)
 *A63F 13/30* (2014.01)
 *A63F 13/54* (2014.01)
 *A63F 13/52* (2014.01)
 *A63F 13/92* (2014.01)

(52) U.S. Cl.
 CPC .............. *A63F 13/44* (2014.09); *A63F 13/52* (2014.09); *A63F 13/54* (2014.09); *A63F 13/92* (2014.09)

(56) References Cited

OTHER PUBLICATIONS

Decision of Allowance in TW Patent Application No. 105100897, dated Aug. 23, 2017, 3pp.
Office Action in JP Application No. 2015-004872, dated Jun. 5, 2015.
Notice of Allowance in JP Application No. 2015-004872, dated Aug. 20, 2015.
International Search Report in PCT/JP2016/050630, dated Mar. 29, 2016.
Written Opinion in PCT/JP2016/050630, dated Mar. 29, 2016.

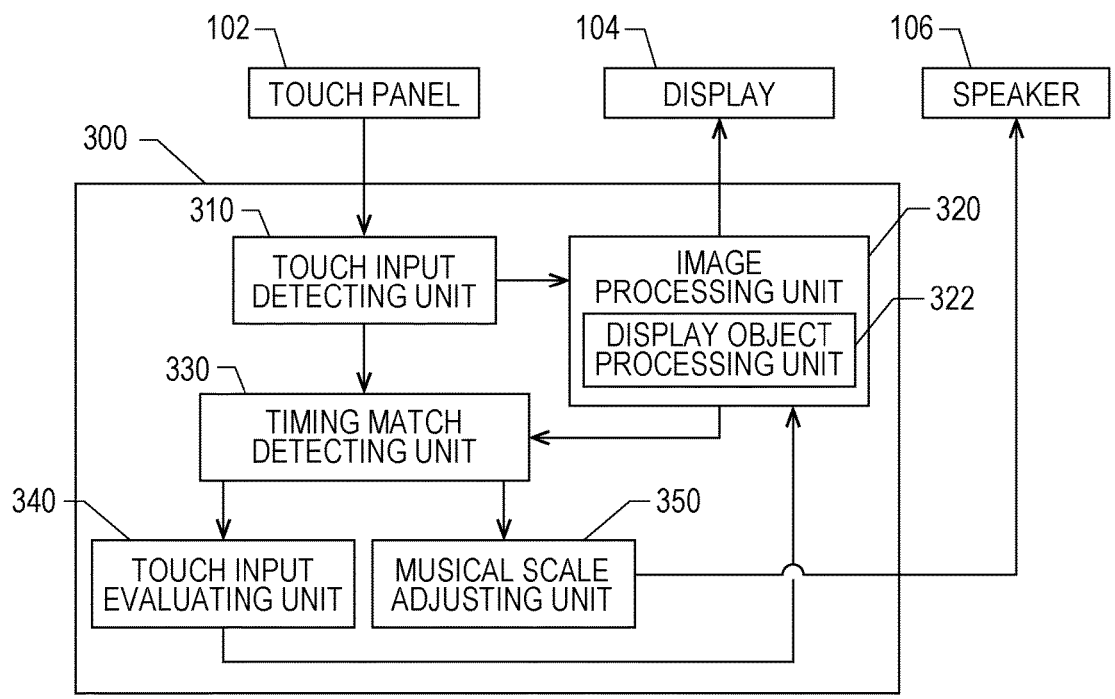
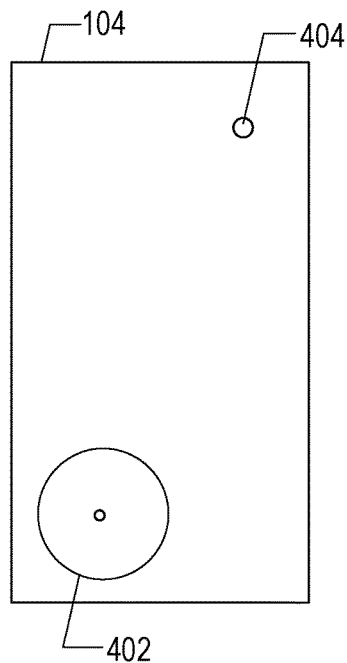

604

INTERFACE FOR ADVANCING GAME BY TOUCH INPUT, AND TERMINAL

RELATED APPLICATIONS

The present application is a National Phase entry of International Application No. PCT/JP2016/050630, filed Jan. 12, 2016, which claims priority of Japanese Application No. 2015-004872, filed Jan. 14, 2015.

TECHNICAL FIELD

This disclosure relates to an interface for advancing a game by touch input performed by a user, and to a terminal.

BACKGROUND ART

In recent years, a terminal that does not include a keyboard or the like but includes a touch panel configured to receive only touch input has been widely available. Further, Patent Literature 1 (JP 2013-000386 A), for example, describes a portable game device.

A game is played on a terminal including a touch panel based on timing at which an object displayed on a display is moved in time with music. In the portable game device of Patent Literature 1, the game is advanced as follows. The object displayed on the display is moved in time with music. The user performs touch input to a display that is different from the display on which the object is displayed in synchronization with the timing at which the object aligns with a timing indicator.

SUMMARY

In the technology of Patent Literature 1, a dedicated terminal including a second display separate from the object displaying display is used. Further, an operation of simply touching the display different from the object displaying display in time with music is a monotonous input operation for the user, and the user may be bored with the game after reaching a certain level because there is no development in game contents.

This disclosure has been made in view of the above, and provides a more amusing timing game. That is, this disclosure relates to a terminal including a display and a touch panel provided in association with the display. The terminal is configured to detect an initial touch position at which first touch input is input to the touch panel. The terminal is further configured to display, on the display, a timing indicator that moves from the initial touch position to a predetermined position in the display, and then move from the predetermined position to the initial touch position. The terminal is further configured to detect whether or not a next touch input is input when the timing indicator moves to the initial touch position.

In addition, this disclosure also relates to a non-transitory computer readable medium for storing instructions to be executed on a terminal including a display and a touch panel provided in association with the display. The instructions are able to cause the terminal to detect an initial touch position at which first touch input is input to the touch panel. The instructions are able to cause the terminal to display, on the display, an elastic object having an initial shape at the initial touch position. The instructions are able to cause the terminal to deform the elastic object from the initial shape so as to form a leading end portion that extends to a predetermined position of the display, and displaying, on the display, a timing indicator in superimposition with the leading end portion. The instructions are able to cause the terminal to move the timing indicator to the initial touchposition. The instructions are able to cause the terminal to detect whether or not a next touch input is input when the timing indicator moves to the initial touch position.

In addition, this disclosure relates to a non-transitory computer readable medium for storing instructions to be executed on a terminal including a display and a touch panel provided in association with the display. The instructions are able to cause the terminal to detect an initial touch position at which first touch input is input to the touch panel. The instructions are able to cause the terminal to display, on the display, an elastic object having an initial shape at the initial touch position. The instructions are able to cause the terminal to display, on the display, the elastic object so that the elastic object is deformed from the initial shape so as to extend to a predetermined position of the display, and is then returned to the initial touch position from the predetermined position.

The above-mentioned features and advantages or other features and advantages of this disclosure are made clear from the following specific description of embodiments of this disclosure, the attached drawings, and the claims.

According to this disclosure, increasing a user's amusement in a timing game is possible.

BRIEF DESCRIPTION OF DRAWINGS

FIG. 3 is a block diagram of a terminal according to at least one embodiment of this disclosure.

FIG. 4A is a schematic line diagram of a display of an elastic object and a timing indicator according to at least one embodiment of this disclosure.

DETAILED DESCRIPTION

Figure 1:
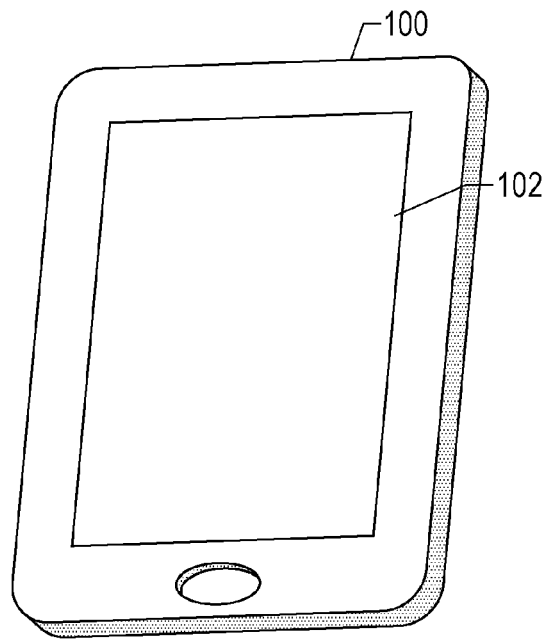
FIG. 1 is a perspective view of a terminal according to at least one embodiment of this disclosure.

Now, embodiments of this disclosure are described. FIG. 1 is a perspective view of a terminal according to at least one embodiment of this disclosure. A terminal 100 illustrated in FIG. 1 includes a touch panel 102 also having a screen displaying function. In this disclosure, a component for driving the screen for a displaying function of the touch panel 102 is referred to as a display 104, shown in FIG. 3. Further, the terminal may include a speaker 106, shown in FIG. 3. The touch panel 102 is controlled by a processor to detect a touch operation performed by the user. In at least one embodiment, the touch operation includes physical contact with the touch panel 102 by a user or an instrument manipulated by the user, such as a stylus. In at least one embodiment, the touch operation includes the user or the instrument being located proximate the touch panel 102 without physical contact. The display 104 is configured to display graphics corresponding to the touch operation performed onto the touch panel by the user. The terminal 100 is a device for achieving functions shown in FIG. 3. The terminal may be any terminal including a touch panel, for example, devices such as a smartphone, a PDA, and a tablet computer.

Figure 2:
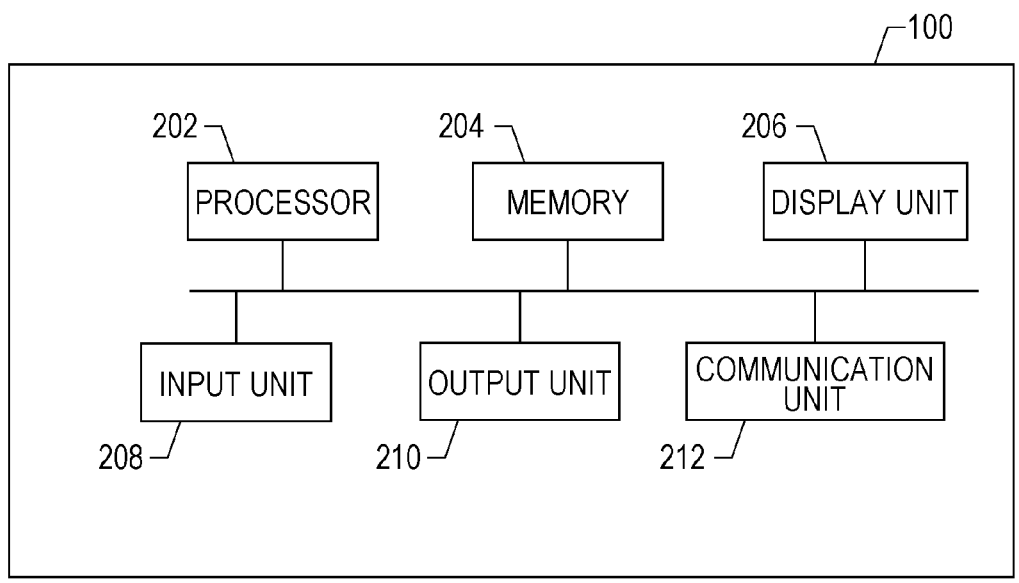
FIG. 2 is a diagram of a hardware configuration a terminal according to at least one embodiment of this disclosure.

As illustrated in FIG. 2, the terminal 100 may include a processor 202, a memory 204, a display unit 206, an input unit 208, an output unit 210, and a communication unit 212, and those units are connected to each other via a bus so as to enable data communication therebetween. The memory 204 of the terminal 100 stores interface program according to at least one embodiment of this disclosure, a game program, and game data, and those programs are executed by the processor 202 so that the user can enjoy a game with use of the touch panel 102 of the terminal 100. The memory 204 temporarily stores data generated while the processor 202 operates in accordance with the interface program and data to be used by the processor 202. The display unit 206 corresponds to the display 104, the input unit 208 corresponds to the touch panel 102, and the output unit 210 corresponds to the speaker 106. The communication unit 212 is controlled by the processor 202 to establish connection between the terminal 100 and a network. The communication unit 212 of the terminal 100 may be used to supply the interface program, the game program, or the game data to the terminal 100 from a remote location via the communication network. In at least one embodiment, the communication network is a wired network. In at least one embodiment, the communication network is a wireless network.

FIG. 3 is a block diagram of the terminal 100 according to at least one embodiment of this disclosure. The terminal 100 may include a processing unit 300 including at least a part of a touch input detecting unit 310, an image processing unit 320, a timing match detecting unit 330, a touch input evaluating unit 340, and a musical scale adjusting unit 350. The image processing unit 320 may further include a display object processing unit 322. The touch panel 102 is controlled by the processor to detect a touch operation performed by the user. The processing unit 300 can generate graphics based on the touch operation, which is performed by the user and detected by the touch panel 102, to output the graphics to the display 104, or generate sounds of different musical scales based on the touch operation, which is performed by the user and detected by the touch panel 102, to output the sounds to the speaker 106. In FIG. 3, each element shown as a functional block for various types of processing which, in at least one embodiment, are implemented by the processor, the memory, or other integrated circuits in terms of hardware, or may be achieved by various programs loaded in the memory in terms of software. Therefore, a person of ordinary skill in the art would understand that functions of those functional blocks may be achieved by means of hardware executing software.

Now, the operation of each functional unit included in the processing unit 300 illustrated in FIG. 3 is described in detail. The touch input detecting unit 310 can detect various types of operation information that are based on the operation performed onto the user's touch panel by a user's finger or the like, for example, a touch position of a tap operation being a brief contact. Specifically, when a touch sensor detects a tap operation corresponding to a brief touch performed onto the touch panel by a user's finger or the like, the touch input detecting unit 310 detects a coordinate position of touch input corresponding to the tap operation. The touch input detecting unit 310 detects the coordinate position of the touch input corresponding to the first tap operation as an initial touch position. The initial touch position may be any position on the display 104. The touch input detecting unit 310 can detect not only the tap operation corresponding to a brief contact such as hitting the touch surface, but also a swipe operation in which the user's finger is moved on or along a surface of the touch panel 102 while the finger is held in contact with (or proximate) the touch panel. In the following, the operation performed by the user's finger is described as an example, but the operation is not limited to one performed by the user's finger, and a stylus or the like may be used.

When the touch input detecting unit 310 detects the initial touch position of the tap operation, the image processing unit 320 displays, on the display 104, an initial-shape elastic object about the initial touch position serving as the center. After that, the image processing unit 320 generates instructions for displaying, on the display 104, the elastic object that is elastically deformed so that a part of the elastic object is elastically extended to a predetermined position from the initial shape, and then the elastic object is restored to the initial shape, and further generates instructions for displaying a timing indicator in synchronization with the movement of the elastic object. The elastic object is an object that behaves as an elastic body on the display in accordance with the tap operation performed onto the touch panel by the user. The predetermined position may be any position on the display 104, and the image processing unit 320 specifies the predetermined position every time the user performs the touch input. In at least one embodiment, the image processing unit 320 randomly determines the predetermined position. As a distance between the predetermined position and the initial touch position is increased, the time period for the elastic object to extend from the initial touch position to the predetermined position and then return to the initial touch position can be increased. In at least one embodiment, the time period for the elastic object to extend from the initial touch position to the predetermined position and then return to the initial touch position is based on a feature of the character, such as a weapon used by the character. That is, the time period for making a request to the user for the next touch input from the previous touch input can be increased.

Figure 4B:
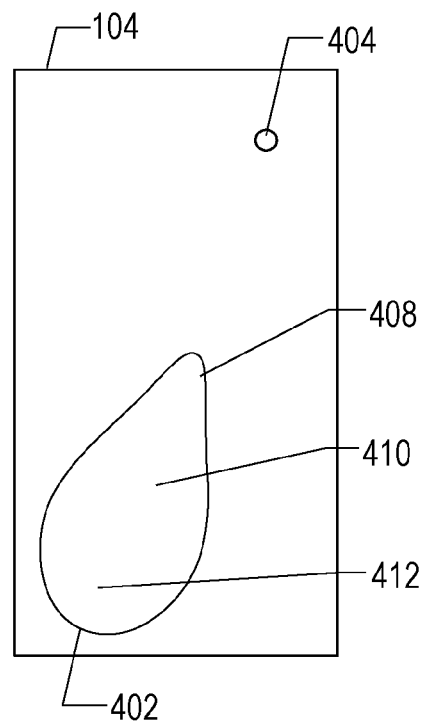
FIG. 4B is a schematic line diagram of a display of an elastic object and the timing indicator according to at least one embodiment of this disclosure.
Figure 4C:
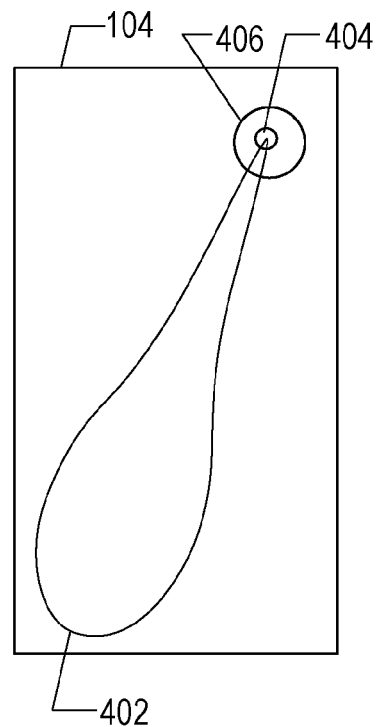
FIG. 4C is a schematic line diagram of a display of an elastic object and the timing indicator according to at least one embodiment of this disclosure.

Now, with reference to FIG. 4A to FIG. 4C, the flow of the processing of the image processing unit 320 is described. When the initial touch position is detected, the image processing unit 320 generates instructions for displaying, on the display 104, an initial-shape elastic object 402 about the detected initial touch position serving as the center (first display processing). Then, the image processing unit 320 determines the predetermined position, which is a position to which the elastic object is most extended, at any position on the display. In at least one embodiment, the image processing unit 320 randomly determines the predetermined position. The initial shape of the elastic object 402 is, for example, a circular shape as in FIG. 4A. In FIG. 4A, the predetermined position is, for example, a position 404. In FIG. 4A, the predetermined position 404 is displayed as an example in order to show that the predetermined position 404 is not changed throughout FIG. 4A to FIG. 4C, but the predetermined position 404 may not be displayed on display 104 during operation.

Next, as in FIG. 4B, the image processing unit 320 generates instructions for displaying, on the display 104, the elastic object 402 that is gradually pulled and extended from the initial touch position to the predetermined position 404 so that the elastic object 402 is extended while being elastically deformed (second display processing). FIG. 4B is a diagram of a shape of the elastic object obtained before a leading edge portion of the elastic object reaches the predetermined position according to at least one embodiment. After that, when a leading edge portion 408 of the elastic object 402 reaches the predetermined position 404 as in FIG. 4C, the image processing unit 320 generates instructions for displaying, on the display 104, a timing indicator 406 in superimposition with the leading edge portion 408 of the elastic object (second display processing). The elastic object may include a base portion 412 fixed to the initial touch position, the leading edge portion 408, and a connection portion 410 connecting between the base portion and the leading edge portion, as shown in FIG. 4B. The elastic object gradually moves at a predetermined speed while deforming so that the leading edge portion 408 moves toward the predetermined position 404 under a state in which the base portion 412 is kept fixed to the initial touch position. Therefore, the elastic object is displayed as if the elastic object is elastically deforming on the display 104. When the elastic object 402 is extended to the predetermined position 404 as in FIG. 4C, for example, the user can attack an enemy character. The timing indicator is, for example, an indicator for showing the timing at which the user is attacking an enemy character, or for showing the timing to make a request to the user for the tap operation when the leading edge portion of the elastic object is returned to the initial touch position and thus the elastic object is restored to the initial shape. The timing indicator 406 is a circular icon as an example in FIG. 4C, but may have other shapes.

Next, the image processing unit 320 generates instructions for displaying, on the display 104, the elastic object so that the pulling of the elastic object from the predetermined position is released, and thus the elastic object is returned to the initial touch position while being restored to the initial shape at a predetermined speed in accordance with a restoring force as if the elastic object elastically deforms (third display processing). One of ordinary skill in the art would recognize that as the restoring force increases the predetermined speed also increases. In at least one embodiment, the restoring force is adjustable by a user, such as by selecting a difficulty level for a game played. Further, the image processing unit 320 can display, on the display, the timing indicator that moves from the predetermined position to the initial touch position in synchronization with the movement of the leading edge portion of the elastic object (third display processing). The timing indicator 406 may be displayed to be moved from the initial touch position 402 to the predetermined position 404 so as to correspond to the touch input in synchronization with the movement of the leading edge portion 408 of the elastic object. The timing indicator may be further displayed to be moved to the initial touch position, or may be displayed to be moved from a middle of a way in which the leading edge portion of the elastic object returns to the initial touch position from the predetermined position. As described above, the timing indicator shows the timing to make a request to the user for the tap operation, and hence when the timing indicator is displayed immediately before the elastic object is restored to the initial shape, the user cannot estimate the timing to perform the touch input based on the timing indicator. Therefore, the image processing unit 320 generates instructions for displaying the timing indicator for a period that is sufficient for the user to estimate the timing to perform the touch input.

After that, every time the touch input performed onto the touch panel by the user is detected, the image processing unit 320 repeats the processing of specifying the predetermined position 404 at any position on the display, and displaying, on the display 104, the elastic object that elastically deforms from the initial touch position 402 to the newly specified predetermined position 404 and then returns to the initial touch position 402 and the timing indicator 406 in synchronization with the movement of the elastic object. In at least one embodiment, the image processing unit 320 randomly determines the predetermined position. The image processing unit 320 can freely determine the period to make a request for the next touch operation from the previous touch input, but when the period is too short, the user operation is difficult, and when the period is too long, for example, the user cannot sufficiently enjoy an attack action in which the user desires to attack the enemy character a large number of times within a short time period.

Figure 5A:
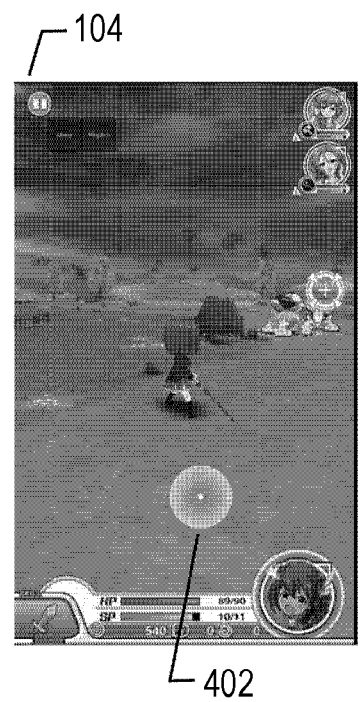
FIG. 5A is a screenshot of a game including an elastic object and the timing indicator according to at least one embodiment of this disclosure.
Figure 5B:
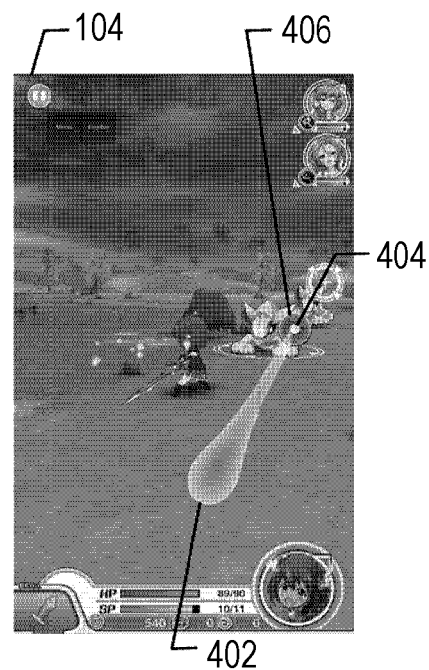
FIG. 5B is a screenshot of a game is including an elastic object and the timing indicator according to at least one embodiment of this disclosure.
Figure 5C:
FIG. 5C is a screenshot of a game of an elastic object and the timing indicator according to at least one embodiment of this disclosure.

In at least one embodiment, the elastic object is displayed in synchronization with the movement of the timing indicator, and thus the user can more visually recognize the distance and the direction from the initial touch position to the timing indicator. In at least one embodiment, the elastic object is used when an enemy character is attacked, and hence the user can acquire a simulated experience that simulates an attack performed with use of a smartphone exhibiting elasticity. Further, the user can play the game contents by performing the touch input at good timing in accordance with the movement of the timing indicator to attack and defeat the enemy character. FIG. 5A to FIG. 5C are screenshots of a game according to at least one embodiment of this disclosure is executed. FIG. 5A includes the initial-shape elastic object 402 located at the detected initial touch position. FIG. 5B includes the deformed elastic object 402 that is deformed so as to be pulled and extended from the initial touch position to the predetermined position 404, and the timing indicator 406 located at the predetermined position 404. One of ordinary skill in the art would recognize that in at least one embodiment predetermined position 404 is not displayed. FIG. 5C includes the elastic object 402 that is released from being pulled from the predetermined position 404 to be restored to the initial shape and returned to the initial touch position, and the timing indicator 406 that has moved together with the elastic object from the predetermined position to the initial touch position.

When the timing indicator 406 returns to the initial touch position, the timing match detecting unit 330 detects whether or not the next touch input is detected. More specifically, the timing match detecting unit 330 acquires, from the touch input detecting unit 310, the detection information of the next touch input performed by the user. Further, the timing match detecting unit 330 acquires, from the image processing unit 320, the time that the timing indicator returns to the initial touch position. The timing match detecting unit 330 determines whether or not the next touch input is performed when the timing indicator returns to the initial touch position, and whether or not the next touch input is performed with respect to the initial touch position. In at least one embodiment, a determination of whether or not the next touch input is performed with respect to the initial touch position is not determined. The reason is because, while the timing indicator returns to the initial touch position, for example, the enemy character may move to be superimposed on the initial touch position.

Figure 6A:
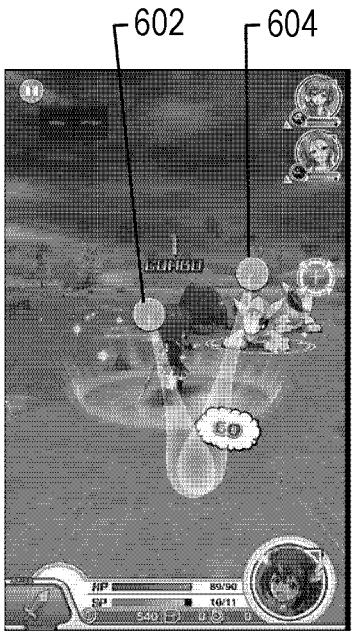
FIG. 6A is a screenshot of a game including an elastic object and two timing indicators according to at least one embodiment of this disclosure.
Figure 6B:
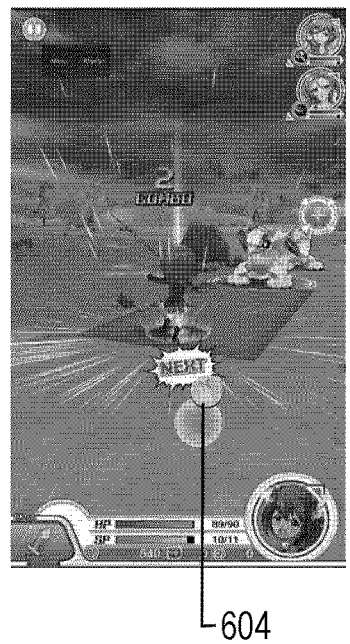
FIG. 6B is a screenshot of a game an elastic object and the two timing indicators according to at least one embodiment of this disclosure.
Figure 6C:
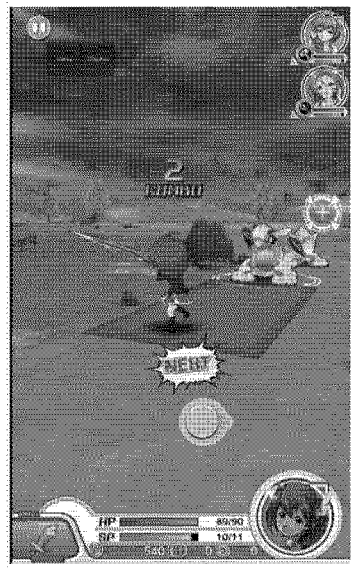
FIG. 6C is a screenshot of a game including an elastic object and the two timing indicators according to at least one embodiment of this disclosure.

When the timing match detecting unit 330 detects the next touch input with respect to the initial touch position when the timing indicator returns to the initial touch position, the touch input evaluating unit 340 can increase an evaluation value of the next touch input. More specifically, for example, when the enemy character is attacked by the first touch input (first touch input), a damage (evaluation value) of 10 is assume to be given to the enemy character. When the next touch input (second touch input) is detected to be performed at good timing when the timing indicator returns to the initial touch position, the touch input evaluating unit 340 can set the damage to be given to the enemy character by the second touch input as 20, for example. Further, when the next touch input (third touch input) is performed at good timing when the timing indicator returns to the initial touch position, the touch input evaluating unit 340 can set the damage to be given to the enemy character by the third touch input as 30, for example. Therefore, unless the user performs the next touch input with respect to an initial touch position when the timing indicator returns to the initial touch position, the user cannot increase the evaluation value of the next touch input. Every time the evaluation value of the touch input is increased, the touch input evaluating unit 340 can change how to display the timing indicator such as changing the color or the shape of the timing indicator or blinking the timing indicator. Further, the image processing unit 320 generates instructions for displaying, on the display 104, a value associated with the determined evaluation value of the touch input. For example, the image processing unit 320 generates instructions for displaying the damage to be given to the enemy character, display the remaining power of the enemy character attacked by the attacking force, or display letters representing that the touch input is performed at good timing, for example, "COMBO" as shown in FIG. 6A to FIG. 6C. Good timing occurs when the second touch is detected when the timing indicator overlaps with the initial touch position. In this disclosure, the user can touch the display in synchronized timing with the timing indicator displayed on the display to cause change in development of a battle game, for example, increasing the attack force of the character, and hence a more amusing game can be advanced. In at least one embodiment, the extension of the elastic object is repeated following each detected touch with good timing until at least one of an enemy character is destroyed or a touch with bad timing is detected. Bad timing results from detection of a touch when the timing indicator does not overlap with the initial touch position.

When the timing match detecting unit 330 detects the next touch input (second touch input) with respect to the initial touch position at good timing when the timing indicator returns to the initial touch position, the musical scale adjusting unit 350 outputs a sound of a first musical scale, for example, a "sound of C" to the speaker 106. Further, when the timing match detecting unit 330 detects the next touch input (third touch input) at good timing, the musical scale adjusting unit 350 outputs a sound of a second musical scale, for example, a "sound of D" to the speaker 106. The sound of the second musical scale can be set to be higher than the sound of the first musical scale. That is, every time the next touch input performed by the user is detected at good timing, the musical scale adjusting unit 350 outputs a sound of a different musical scale to the speaker 106. The user can aurally understand that the touch input is performed at good timing in synchronization with the timing indicator displayed on the display while playing the game, and hence can play a more amusing game.

According to at least one embodiment of this disclosure, when the timing match detecting unit 330 detects the next touch input with respect to the initial touch position when the timing indicator returns to the initial touch position, the number of timing indicators may be increased. As the number of timing indicators is increased, the user is required to perform the touch input at good timing for each of the plurality of timing indicators. Thus, a harder operation is required, and the development of the game becomes more interesting. Further, as the number of timing indicators is increased, the number of attacks to be performed to the enemy character by one touch input can be increased.

Now, with reference to FIG. 6A to FIG. 6C, description is given of a flow of processing of a case where the number of timing indicators is increased. FIG. 6A to FIG. 6C are screenshots of a game including multiple timing indicators according to at least one embodiment of this disclosure. When the previous touch input is detected and the timing match detecting unit 330 detects the next touch input (second touch input) with respect to the initial touch position when the timing indicator returns to the initial touch position in correspondence to the previous touch input, the image processing unit 320 increases the number of timing indicators, for example, from 1 to 2. Then, the image processing unit 320 determines, for the respective timing indicators, two predetermined positions, for example, a second predetermined position and a third predetermined position that differ from each other in distance and direction from the initial touch position. Next, the image processing unit 320 displays, on the display 104, the elastic object and the timing indicator for each of the second and third predetermined positions as in the case where the elastic object and the timing indicator are displayed for the predetermined position (first predetermined position) relating to the first touch input. Next, when the timing match detecting unit 330 detects the touch input (third touch input and fourth touch input) for each of the two timing indicators at good timing when each of the two timing indicators returns to the initial touch position, the image processing unit 320 can set the number of timing indicators to, for example, 3.

For example, FIG. 6A is a screenshot including the timing match detecting unit 330 has already detected once (1 COMBO) the touch input (second touch input) with respect to the initial touch position when the timing indicator returns to the initial touch position so as to correspond to the detected first touch input, and the number of timing indicators has been increased to 2. In FIG. 6A, two timing indicators (602, 604) are displayed at the second and third predetermined positions, and two elastic objects are displayed so that their leading edge portions are superimposed on the timing indicators, respectively. The second and third predetermined positions corresponding to the respective timing indicators differ from each other in distance from the initial touch position, and hence each timing indicator returns to the initial touch position at different timing. FIG. 6B is a screenshot obtained when the next touch input (third touch input) with respect to the initial touch position has been already detected (2 COMBO) when the timing indicator having a shorter distance from the initial touch position returns to the initial touch position, and the timing indicator having a longer distance from the initial touch position is on its way to return to the initial touch position. FIG. 6C is a screenshot obtained when the timing indicator 604 having a longer distance from the initial touch position returns to the initial touch position after that. In FIG. 6C, when the user performs the touch input with respect to the initial touch position at good timing, the number of timing indicators is increased to, for example, 3. In this disclosure, the user can increase the number of timing indicators when the user performs the touch input at good timing in synchronization with the timing indicator displayed on the display, and hence the number of attacks to be performed to the enemy character by one touch input can be increased. Therefore, the user can play a more amusing game.

According to at least one embodiment of this disclosure, the image processing unit 320 may include the display object processing unit 322. When the display object processing unit 322 detects another operation, for example, a swipe operation on a display object during a period from when the previous touch input is detected to when the timing indicator returns to the initial touch position, the display object processing unit 322 generates instructions for displaying, on the display 104, a display object (for example, a girl character shown at the center in FIG. 6A to FIG. 6C) that moves in accordance with the direction and the distance of the detected swipe operation. The user may move the display object in any direction during the period from when the previous touch input is detected to when the timing indicator returns to the initial touch position so as to, for example, prevent the display object from being attacked by an enemy character (for example, a dinosaur character shown on the upper right in FIG. 6A to FIG. 6C) during the attack action in the game. The swipe operation is not limited to be used for avoidance of the attack, and may simply cause the display character to walk, run, or perform other motions in the swipe direction and distance. As described above, when the user performs the next touch input at good timing when the timing indicator returns to the initial touch position, the user can increase the evaluation value of the next touch input. According to at least one embodiment of this disclosure, other operations can be received between the touch inputs, and thus the user can continuously increase the evaluation value of the touch input while performing other operations on the display object.

Figure 7:
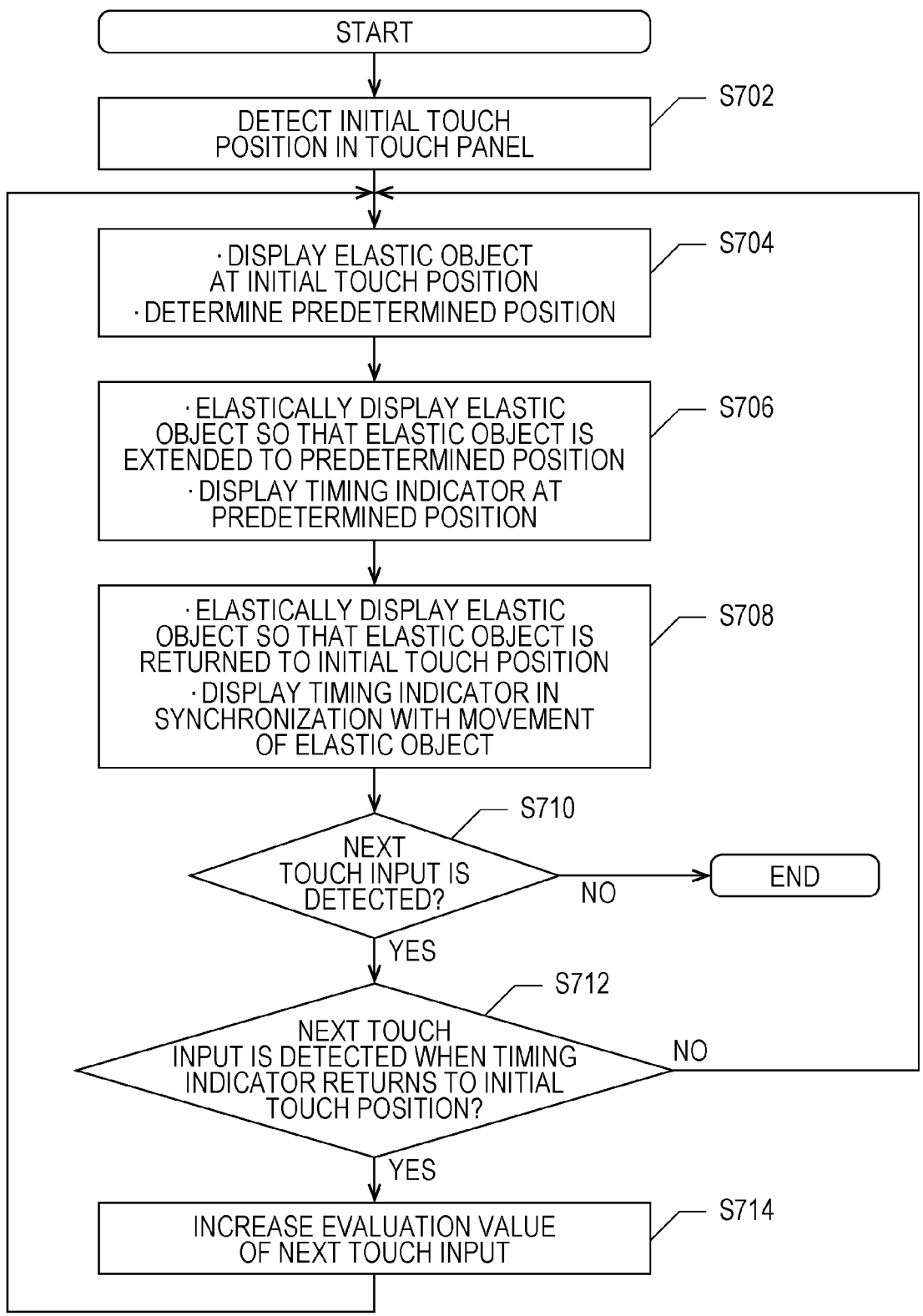
FIG. 7 is a flowchart of a method of processing of the terminal according to at least one embodiment of this disclosure.

Next, with reference to FIG. 7, description is given of the flow of the series of processing according to at least one embodiment of this disclosure. First, the touch input detecting unit 310 detects the initial touch position in the touch panel (Step S702). Next, when the touch input detecting unit 310 detects the initial touch position of the tap operation, the image processing unit 320 generates instructions for displaying, on the display 104, the initial-shape elastic object about the initial touch position serving as the center. Then, the image processing unit 320 randomly specifies the predetermined position, which is the position to which the elastic object is extended, at any position on the display (Step S704). Next, the image processing unit 320 elastically displays the elastic object so that the leading edge portion is elastically extended to the predetermined position from the initial shape, and displays the timing indicator when the leading edge portion of the elastic object reaches the predetermined position (Step S706). Next, the elastic object is elastically displayed so that the pulling of the elastic object toward the predetermined position is released, and thus the elastic object is elastically deformed to return to the initial shape at a predetermined speed in accordance with a restoring force so as to return to the initial touch position, and the timing indicator is displayed in synchronization with the movement of the leading edge portion of the elastic object (Step S708). Next, the touch input detecting unit 310 determines whether or not the next touch input is detected (Step S710). When the next touch input is detected, the timing match detecting unit 330 detects whether or not the next touch input with respect to the initial touch position 402 is detected when the timing indicator returns to the initial touch position (Step S712). In a case where the next touch input is performed at good timing when the timing indicator returns to the initial touch position, the touch input evaluating unit 340 increases the evaluation value of the next touch input (Step S714), and the processing returns to Step S704. On the other hand, when the next touch input is not performed at good timing when the timing indicator returns to the initial touch position, the processing returns to Step S704 without increasing the evaluation value of the next touch input. After that, Step S704 to Step S714 are repeatedly executed every time the next touch input is detected, and the processing ends when the next touch input is not detected any more.

The following supplementary notes are given for embodiments of this disclosure.

(Supplementary Note 1)

According to at least one embodiment of this disclosure, there is provided a terminal including a display and a touch panel provided in association with the display. A processor of the terminal is configured to execute a touch input detecting step of detecting an initial touch position of first touch input performed on the touch panel. The processor is further configured to execute a first display processing step of displaying, on the display, an elastic object at the detected initial touch position. The processor is further configured to execute a second display processing step of deforming the elastic object so that the elastic object is pulled and extended from the initial touch position to a predetermined position, and displaying the deformed elastic object on the display. The processor is further configured to execute a third display processing step of displaying, on the display, the elastic object that is released from being pulled from the predetermined position to be returned to the initial touch position, and displaying, on the display, a timing indicator that moves from the predetermined position to the initial touch position. The processor is further configured to execute a timing match detecting step of detecting whether or not next touch input is detected when the timing indicator returns to the initial touch position.

(Supplementary Note 2)

According to at least one embodiment of this disclosure, the processor of the terminal is configured to repeatedly execute, every time the next touch input is detected a step of determining the predetermined position at a random position; and the first display processing step, the second display processing step, the third display processing step, and the timing match detecting step for the predetermined position determined with respect to the next touch input.

(Supplementary Note 3)

According to at least one embodiment of this disclosure, the processor of the terminal is configured to further execute a touch input evaluating step of increasing an evaluation value of the next touch input in a case where, in the timing match detecting step, the next touch input is detected when the timing indicator returns to the initial touch position.

(Supplementary Note 4)

According to at least one embodiment of this disclosure, the terminal further includes a speaker, and the processor of the terminal is configured to further execute a musical scale adjusting step of outputting a sound of a first musical scale to the speaker in a case where, in the timing match detecting step, the next touch input is detected when the timing indicator returns to the initial touch position, and outputting a sound of a second musical scale to the speaker in a case where, in the next timing match detecting step, further next touch input is detected when the timing indicator returns to the initial touch position.
(Supplementary Note 5)

According to at least one embodiment of this disclosure, the processor of the terminal is configured to increase a number of timing indicators in a case where, in the timing match detecting step, the next touch input is detected when the timing indicator returns to the initial touch position. The processor is configured to execute the first display processing step, the second display processing step, the third display processing step in accordance with the predetermined position corresponding to each of the timing indicators increased in number. The processor is configured to execute the timing match detecting step of detecting whether or not the touch input is detected when each of the timing indicators increased in number returns to the initial touch position.
(Supplementary Note 6)

According to at least one embodiment of this disclosure, the processor of the terminal is configured to further execute, when a swipe operation on a display object is detected during a period from when previous touch input is detected to when the timing indicator relating to the previous touch input moves to the initial touch position, a display object processing step of displaying the display object that moves in accordance with a direction and a distance of the detected swipe operation.
(Supplementary Note 7)

According to at least one embodiment of this disclosure, there is provided a terminal including a display. The terminal further includes a touch panel provided in association with the display. The terminal further includes a touch input detecting unit configured to detect an initial touch position of first touch input performed on the touch panel. The terminal further includes a first display processing unit configured to display, on the display, when the initial touch position is detected, an elastic object at the detected initial touch position. The terminal further includes a second display processing unit configured to deform the elastic object so that the elastic object is pulled and extended from the initial touch position to a predetermined position, and to display the deformed elastic object on the display. The terminal further includes a third display processing unit configured to display, on the display, the elastic object that is released from being pulled from the predetermined position to be returned to the initial touch position, and to display, on the display, a timing indicator that moves from the predetermined position to the initial touch position. The terminal further includes a timing match detecting unit configured to detect whether or not next touch input is detected when the timing indicator returns to the initial touch position.

This disclosure has been described above with reference to embodiments, but this disclosure is not limited to the above-mentioned embodiments. A person skilled in the art would understand that various modifications can be made to embodiments as long as the modifications do not deviate from the spirit and scope of this disclosure described in the claims.

The invention claimed is:
1. A terminal comprising:
a display;
a touch panel associated with the display; and
a processor connected to the display and the touch panel, wherein the processor is configured to execute the steps of:
detecting an initial touch position corresponding to a first touch input to the touch panel;
generating instructions for displaying, on the display, a timing indicator that moves from the initial touch position to a predetermined position in the display, and then moves from the predetermined position to the initial touch position;
detecting whether a next touch input is received when the timing indicator is displayed as overlapping the initial touch position;
generating instructions for displaying, on the display, an elastic object having an initial shape at the initial touch position; and
generating instructions for displaying the elastic object deformed from the initial shape so as to form a leading edge portion extending toward the predetermined position, and generating instructions for displaying, on the display, the timing indicator in superimposition with the leading edge portion; wherein the processor is further configured to display the timing indicator in response to the first touch input at an edge of the elastic object.

2. The terminal according to claim 1, wherein the processor is further configured to execute a step of moving the timing indicator, along a path between the initial touch position and the predetermined position, in response to the next touch input is detected.

3. The terminal according to claim 2, wherein the processor is further configured to generate instructions for displaying a plurality of timing indicators for moving, between the initial touch position and corresponding second predetermined positions of a plurality of second predetermined positions, in response to the next touch input is detected.

4. The terminal according to claim 3, wherein the processor is further configured to generate instructions for displaying a first timing indicator of the plurality of timing indicators moving in a different direction from a second timing indicator of the plurality of timing indicators.

5. The terminal according to claim 3, wherein the processor is further configured to generate instructions for displaying a first timing indicator of the plurality of timing indicators positioned at a different distance from the initial touch position than a second timing indicator of the plurality of timing indicators.

6. The terminal according to claim 1, wherein the processor is further configured to display the elastic object in response to the first touch input, and the elastic object is stationary except for the deformation.

7. The terminal according to claim 1, wherein the processor is further configured to display the elastic object and thereafter deform the elastic object from the initial shape, and the elastic object is stationary except for the deformation.

8. The terminal according to claim 1, wherein the processor is further configured to move the timing indicator from the leading edge portion to a substantial center of the elastic object after the elastic object is deformed.

9. A terminal comprising:
a display;
a touch panel associated with the display; and a processor connected to the display and the touch panel,
wherein the processor is configured to execute the steps
of:
detecting an initial touch position corresponding to a first
touch input to the touch panel;
generating instructions for displaying, on the display, an
elastic object having an initial shape at the initial touch
position;
generating instructions for displaying the elastic object
deformed from the initial shape so as to form a leading
edge portion that extends toward a predetermined position of the display, and generating instructions for
displaying, on the display, a timing indicator in superimposition with the leading edge portion;
generating instructions for moving the timing indicator
from the predetermine position toward the initial touch
position; and
detecting whether a next touch input is input when the
timing indicator overlaps with the initial touch position; wherein the processor is further configured to
display the timing indicator in response to the first
touch input at an edge of the elastic object.

10. The terminal according to claim 9, wherein the
processor is configured to generate instructions for displaying the elastic object deformed from the initial shape in
response to detection of the next touch input.

11. The terminal according to claim 10, wherein the
processor is configured to generate instructions for displaying a second elastic object deformed from the initial shape
in response to detection of the next touch input.

12. The terminal according to claim 11, wherein the
processor is configured to generate instructions for displaying the elastic object deformed in a different direction from
a deformation direction of the second elastic object.

13. The terminal according to claim 11, wherein the
processor is configured to generate instructions for displaying the elastic object extended a first distance from the initial
touch position and the second elastic object extended a
second distance from the initial touch position, and the first
distance is different from the second distance.

14. The terminal according to claim 9, wherein the
processor is further configured to move the timing indicator
from the leading edge portion to a substantial center of the
elastic object after the elastic object is deformed.

15. A terminal comprising:
a display;
a touch panel associated with the display; and
a processor connected to the display and the touch panel,
wherein the processor is configured to execute the steps
of:
detecting an initial touch position corresponding to a first
touch input to the touch panel;
generating instructions for displaying, on the display, an
elastic object having an initial shape at the initial touch
position; and
generating instructions for displaying, on the display, the
elastic object so that the elastic object is deformed from
the initial shape so as to extend toward a predetermined
position of the display, and to return the elastic object
to the initial shape at the initial touch position from the
predetermined position.

16. The terminal according to claim 15, wherein the
processor is configured to generate instructions for displaying the elastic object deformed from the initial shape so as
to extend toward the predetermined position in response to
detection of a next touch input subsequent to the elastic
object returning to the initial touch position.

17. The terminal according to claim 16, wherein the
processor is configured to generate instructions for displaying deforming a plurality of elastic objects in response to
detection of the next touch input.

18. The terminal according to claim 17, wherein the
processor is configured to generate instructions for displaying a first elastic object of the plurality of elastic objects
deformed in a different direction from a deformation direction of a second elastic object of the plurality of elastic
objects.

* * * * *